United States Patent
Wada et al.

(10) Patent No.: US 7,567,737 B2
(45) Date of Patent: Jul. 28, 2009

(54) VARIABLE LIGHT SIGNAL DELAY APPARATUS, AND VARIABLE LIGHT SIGNAL DELAY SYSTEM USING THE SAME

(75) Inventors: Morio Wada, Tokyo (JP); Akira Miura, Tokyo (JP); Chie Sato, Tokyo (JP); Katsuya Ikezawa, Tokyo (JP); Tsuyoshi Yakihara, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 11/168,426

(22) Filed: Jun. 29, 2005

(65) Prior Publication Data

US 2006/0011819 A1     Jan. 19, 2006

(30) Foreign Application Priority Data

Jun. 30, 2004    (JP)          ......................... P. 2004-192764

(51) Int. Cl.
*G02B 6/26*       (2006.01)
*G02B 6/42*       (2006.01)

(52) U.S. Cl. ...................................................... 385/32
(58) Field of Classification Search .................... 385/32
See application file for complete search history.

(56) References Cited

U.S. PATENT DOCUMENTS

| | | | | |
|---|---|---|---|---|
| 5,291,569 | A | * | 3/1994 | Goutzoulis et al. ............. 385/39 |
| 6,034,924 | A | * | 3/2000 | Vakoc ......................... 367/149 |
| 2003/0095263 | A1 | * | 5/2003 | Varshneya et al. .......... 356/477 |
| 2004/0136647 | A1 | * | 7/2004 | Mizuno et al. ................ 385/24 |
| 2004/0184713 | A1 | * | 9/2004 | Sato et al. ...................... 385/16 |

FOREIGN PATENT DOCUMENTS

| | | | |
|---|---|---|---|
| JP | 03135748 A | * | 6/1991 |
| JP | 6-237222 A | | 8/1994 |
| JP | 09054292 A | * | 2/1997 |
| JP | 2002-319896 A | | 10/2002 |

OTHER PUBLICATIONS

Hiroaki Inoue, et al., "Switching characteristics of GaAs directional coupler optical switches", Applied Optics, May 1, 1986, pp. 1484-1490, vol. 25, No. 9.
K. Ishida, et al., "InGaAsP/InP optical switches using carrier induced refractive index change", Appl. Phys. Lett. Jan. 19, 1987, pp. 141-143, vol. 50, No. 3.
Kunio Tada, et al., "Bipolar Transistor Carrier-Injected Optical Modulator/Switch: Proposal and Analysis", IEEE Electron Device Letters, Nov. 1986, pp. 605-606, vol. 7, No. 11.

* cited by examiner

*Primary Examiner*—Frank G Font
*Assistant Examiner*—Erin D Chiem
(74) *Attorney, Agent, or Firm*—Sughrue Mion, PLLC (57) ABSTRACT

A variable light signal delay apparatus includes a first delay optical fiber, a second delay optical fiber having a length different from the first delay optical fiber, and an optical switch having two input ports, two output ports, and paths, through which a light signal propagates, provided between the first delay optical fiber and the second delay optical fiber, in which a light signal input from at least one of the input ports propagated through either the first delay optical fiber or the second delay optical fiber or through neither the first delay optical fiber nor the second delay optical fiber to be output from a desired first output port.

16 Claims, 9 Drawing Sheets

VARIABLE LIGHT SIGNAL DELAY APPARATUS, AND VARIABLE LIGHT SIGNAL DELAY SYSTEM USING THE SAME

CROSS-REFERENCE TO RELATED APPLICATIONS

This application is based upon and claims the benefit of priority from the prior Japanese Patent Applications No. 2004-192764 filed on Jun. 30, 2004, the entire contents of which are incorporated herein by reference.

BACKGROUND OF THE INVENTION

1. Field of the Invention

The present invention relates to a variable light signal delay apparatus for delaying a light signal and a variable light signal delay system using the same, and particularly relates to a variable light signal delay apparatus for varying a delay time of the light signal with a simple configuration and a variable light signal delay system using the apparatus.

2. Description of the Related Art

Through the rapid spread of ADSL (Asymmetric Digital Subscriber Line), FTTH (Fiber-to-the-Home), etc. in the access system, the practical implementation of Gigabit Ethernet (registered trademark), and so forth, an amount of information is rapidly increasing. For this reason, the importance and the demand for an increase in speed and capacity of the communication system are rising, and the optical network system is expected as the technology to realize a higher speed and a larger capacity of the communication system.

The optical communication is classified roughly into the burst type such as the transaction file type, or the like, the packet type used in the IP (Internet Protocol), and the intermittently continued bit stream type used in the telephone service, or the like.

For example, an address contained in a header of a light signal packet must be processed in the IP packet. Mainly the electric signal processing is applied nowadays after the light signal is converted into the electric signal, and therefore it is difficult to improve a performance of the communication system. Accordingly, the tremendous improvement in performance and the increase in speed can be expected if the signal processing can be applied to the light signal as it is. The light signal must be delayed in such optical signal processing, and thus delay elements, delay circuits, and the like are contained in the optical communication system.

Figure 7:
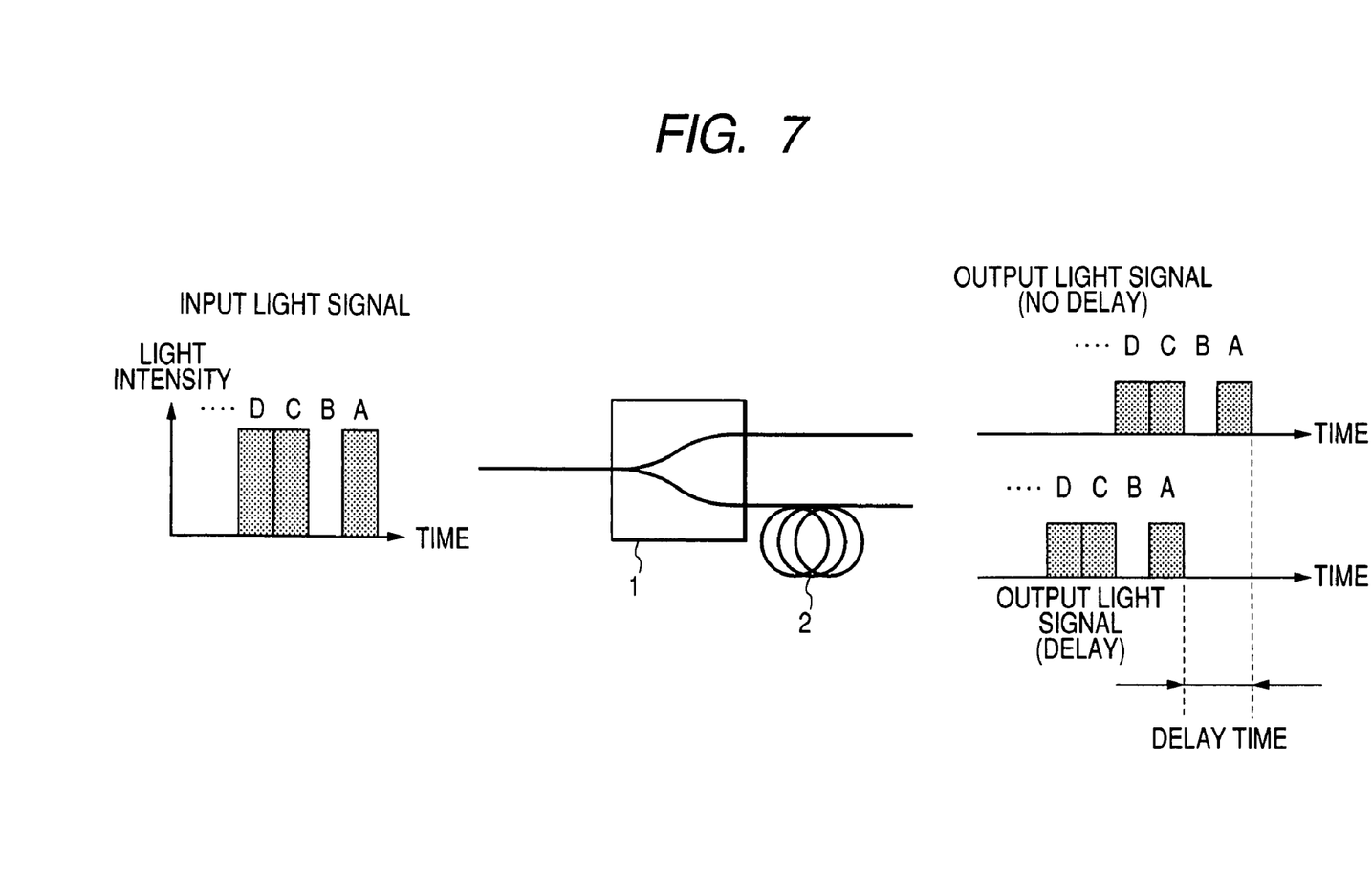
FIG. 7 is a view showing a configurative example of the variable light signal delay apparatus in the related art.

FIG. 7 is a view showing a configuration of an optical delay apparatus in the related art. In FIG. 7, an optical coupler 1 causes an input light signal to branch off into two signals, and then outputs these signals. A delay optical fiber 2 is connected to one output end of the optical coupler 1.

An operation of such optical delay apparatus will be explained hereunder.

The light signal is input into the optical coupler 1. Then, the optical coupler 1 causes the input light signal to branch off into two signals that have a substantially same light intensity respectively. Then, the light signal being output from one output end of the optical coupler 1 passes through the delay optical fiber 2, and then is output therefrom. As a result, the light signal being output through the delay optical fiber 2 is delayed from the light signal being output the other output end of the optical coupler 1 by a time that corresponds to an optical path length of the delay optical fiber 2, and then is output therefrom.

Figure 8:
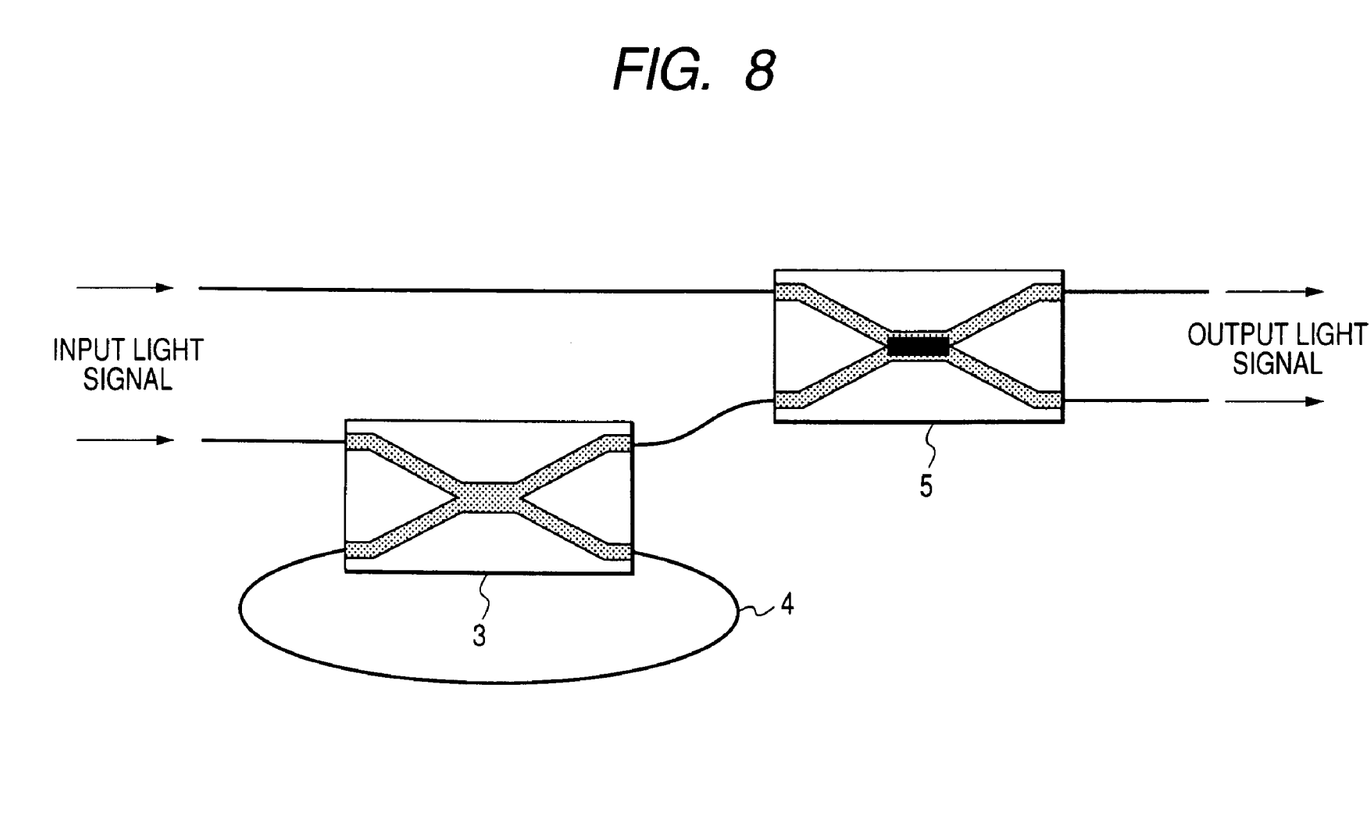
FIG. 8 is a view showing another configurative example of the variable light signal delay apparatus in the related art.

Next, FIG. 8 is a view showing a configuration of a 2-input/2-output optical delay apparatus in the related art (see JP-A-6-237222, for example). In FIG. 8, a passive crossover switch 3 outputs the light signal being input from one input port via a delay optical fiber 4. An active optical switch 5 receives the light signal from the other input port and the passive crossover switch 3 respectively, and outputs the light signal from a desired output port by switching the path.

An operation of such optical delay apparatus will be explained hereunder.

The light signal being input from one input port is switched by the passive crossover switch 3 to pass through the delay optical fiber 4, and then is input into the active optical switch 5. Then, the active optical switch 5 switches the optical path to output the light signal from the desired output port. Also, the light signal being input from the other input port is output from the desired output port via the active optical switch 5. As a result, the light signal being input from one input port can be output with a delay.

Figure 9:
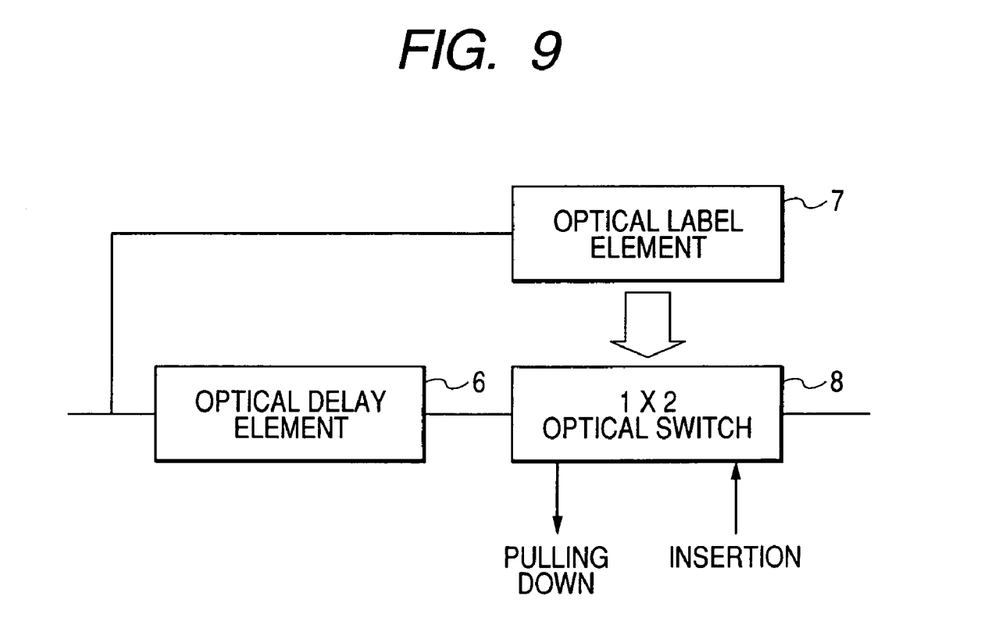
FIG. 9 is a view showing a configuration of an optical coupling/branching apparatus in packet units in the related art.

Next, FIG. 9 is a view showing a configuration of an optical coupling/branching apparatus in packet units (see JP-A-2002-319896, for example). In this apparatus shown in FIG. 9, an optical delay element 6 for delaying the light signal is also provided. In FIG. 9, the input light signal is input into the optical delay element 6 and an optical label selector 7 respectively. Then, the optical label selector 7 operates an optical switch 8 based on the label affixed to the header of the packet. In the meanwhile, the optical delay element 6 delays the packet until an operation of the optical switch 8 is completed, and then outputs the packet to the optical switch 8. As a result, optical coupling/branching operations such as pulling-down and insertion in packet units can be carried out.

JP-A-6-237222 (Paragraph No. 0025, FIG. 6) and JP-A-2002-319896 (Paragraph Nos. 0024 and 0025, FIG. 2) are referred to as the related art.

However, in the related art shown in FIG. 7, for example, a structure in which the optical branch element (e.g., the optical coupler 1) and the optical delaying means (e.g., the delay optical fiber) are provided separately is used as a basic structure. Also, in the related arts shown in FIG. 8 and FIG. 9, a structure in which the optical switch and the optical delaying means (e.g., the delay optical fiber 4, the optical delay element 6) are provided separately is used as a basic structure. Therefore, the above apparatuses are developed to aim at functions that are executed on the premise that various processes including the optical switching, which is executed after a fixed delay is applied to the light signal, are carried out. As a result, such a problem existed that neither a function of varying a delay time of the light signal is provided nor a configuration that can respond flexibly to a system construction of the optical network system is provided. Also, such another problem existed that it is difficult for the above apparatuses to cope with the optical signal processing that must be executed in the optical communication system, the measuring equipment for the optical communication, and the like, for example, the high-level signal processing of varying a shift of the optical bit.

SUMMARY OF THE INVENTION

An object of the present invention is to provide a variable light signal delay apparatus for varying a delay time of a light signal with a simple configuration, and a variable light signal delay system using the apparatus.

The invention provides a variable light signal delay apparatus, having: a first delay optical fiber; a second delay optical fiber having a length different from the first delay optical fiber; and a first optical switch having two first input ports, two first output ports, and paths, through which a light signal propagates, provided between the first delay optical fiber and the second delay optical fiber, in which a light signal input from at least one of the first input ports is propagated through either the first delay optical fiber or the second delay optical fiber or through neither the first delay optical fiber nor the second delay optical fiber to be output from a desired first output port.

In the variable light signal delay apparatus, the first optical switch has four switching portions which respectively switch an output-side path of a light signal to one of two ways, and the four switching portions are: an input-side switching portion to which light signal is input from at least one of the first input ports, an output-side switching portion which switches the output-side path to output a light signal from a desired output port, a first switching portion which forms a loop with the first delay optical fiber, in which a light signal output from one output path of the input-side switching portion is propagated through the first delay optical fiber or not through the first delay optical fiber to output to the output-side switching portion, and a second switching portion which forms a loop with the second delay optical fiber, in which a light signal output from another output path of the input-side switching portion is propagated through the second delay optical fiber or not through the second delay optical fiber to output to the output-side switching portion.

The invention provides a variable light signal delay system having: a plurality of variable light signal delay apparatuses according to claim 1, which are provided in parallel; a second optical switch having two second input ports, in which a light signal input from at least one of the second input ports is output to a desired variable light signal delay apparatus through a path to be switched by the second optical switch; and a third optical switch having two second output ports, in which a light signal input from the desired variable light signal delay apparatus is output from a desired second output port through a path to be switched by the third optical switch; wherein delay optical fibers provided in the plurality of variable light signal delay apparatuses have a different length respectively.

The variable light signal delay system further has a plurality of optical fibers which connect each of the variable light signal delay apparatuses and the third optical switch, and have a different length respectively.

The invention provides a variable light signal delay system having: a plurality of variable light signal delay apparatuses according to claim 1, which are provided in parallel; a second optical switch having two second input ports, in which a light signal input from at least one of the second input ports is output to a desired variable light signal delay apparatus through a path to be switched by the second optical switch; a third optical switch having two second output ports, in which a light signal input from the desired variable light signal delay apparatus is output from a desired second output port through a path to be switched by the third optical switch; and a plurality of optical fibers which connect each of the variable light signal delay apparatuses and the third optical switch, and have a different length respectively.

According to the variable light signal delay apparatus, following advantages can be achieved.

According to the variable light signal delay apparatus, the light signal input from one (or both) of the first input ports can be output from the desired first output port since the first optical switch switches the path. Also, according to switching combinations of the paths, the light signal can be output from either of the output ports to propagate through one of the delay optical fibers having a different length respectively or through none of these delay optical fibers. Therefore, a delay time of the light signal can be changed in three ways. Accordingly, the delay time of the light signal can be varied with a simple configuration. As a result, the flexible network system capable of varying a delay of the light signal can be built up and also the high-level optical signal processing can be realized.

According to the variable light signal delay system, the light signal input from one (or both) of the second input ports of the second optical switch can be output from the desired second output port of the third optical switch through the path that is switched by the second optical switch, the variable light signal delay apparatus, and the third optical switch. Also, respective lengths of the delay optical fibers provided in the variable light signal delay apparatuses are set differently. In other words, according to switching combinations of the paths, the delay times of the light signal can be increased. Also, a variable range of the delay time of the light signal can be expanded easily by just increasing the number of the variable light signal delay apparatuses. As a result, the delay time of the light signal can be varied with a simple configuration.

Further, since the optical fibers for connecting each of the variable light signal delay apparatuses and the third optical switch have a different length respectively, the variable range of the delay time of the light signal can be expanded much more.

DETAILED DESCRIPTION OF THE PREFERRED EMBODIMENTS

Embodiments of the present invention will be explained with reference to the drawings hereinafter.

Figure 1:
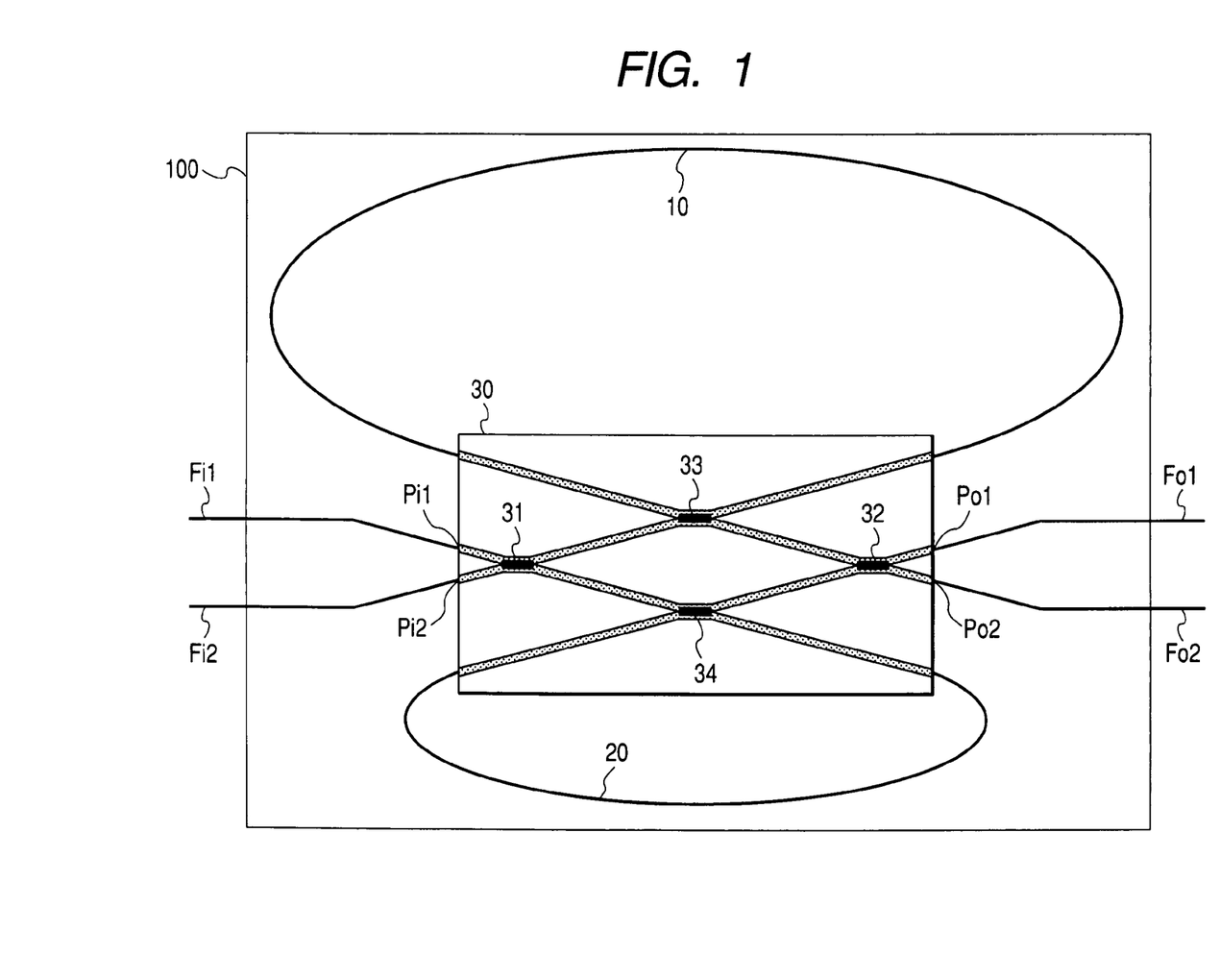
FIG. 1 is a configurative view showing an embodiment of a variable light signal delay apparatus according to the present invention.

FIG. 1 is a configurative view showing an embodiment of a variable light signal delay apparatus 100 according to the present invention. In FIG. 1, a first delay optical fiber 10 and a second delay optical fiber 20 have a different length respectively. In FIG. 1, by way of example, "a length of the delay optical fiber 10">"a length of the delay optical fiber 20" is assumed.

An optical switch 30 is of 2-input/2-output type that has input ports Pi1, Pi2 and output ports Po1, Po2, and has four switching portions (an input-side switching portion 31, an output-side switching portion 32, a first switching portion 33, and a second switching portion 34). The optical switch 30 outputs the light signal, which is input from at least one of the input ports Pi1, Pi2, from the desired output port Po1 or Po2 via any one of three types of paths (a) to (c) given as follows. That is, three types of paths are given as (a) the path passing through the first delay optical fiber 10, (b) the path passing through the second delay optical fiber 20, and (c) the path passing through neither the delay optical fiber 10 nor the second delay optical fiber 20.

Next, explanation of the switching portions 31 to 34 will be made hereunder.

The switching portions 31 to 34 are provided respectively to the portion where two optical paths intersect with each other like an X shape, and switch the optical path to cause the light signal to propagate through the desired optical path. For instance, there are the LiNbO$_3$ directional coupler optical switch using the electro-optic effect or the semiconductor directional coupler optical switch (for example, Hiroaki Inoue and four others, "Switching Characteristics of GaAs Directional Coupler Optical Switches", Applied Optics, Optical Society of America, 1986, Vol. 25, No. 9, pp. 1484-1490), the reflection-type optical waveguide optical switch using the carrier injection (for example, K. Ishida and four others, "InGaAsP/InP Optical Switches using Carrier Induced Refractive Index Change", Applied Physics Letters, American Institute of Physics, 1987, Vol. 50, No. 3, pp. 141-142), the bipolar transistor carrier-injected optical switch that can be operated at a higher speed (for example, K. Tada and one other, "Bipolar Transistor Carrier-Induced Optical Modulator/Switch: Proposal and Analysis", IEEE Electron Device Letters, IEEE, 1986, Vol. EDL-7, No. 11, pp. 605-606), and others. In this event, the light signal goes straight on when the switching portions 31 to 34 are turned OFF, while the light signal is switched to the different optical path when the switching portions 31 to 34 are turned ON.

Respective input-side paths of the input-side switching portion 31 is connected to the input ports Pi1, Pi2, and the light signal is input from at least one of the input ports Pi1, Pi2. The input-side switching portion 31 switches the path to output the light signal to either the first switching portion 33 or the second switching portion 34. In this case, the light signal may be input from both input ports Pi1, Pi2 respectively.

Respective output-side paths of the output-side switching portion 32 are connected to the output ports Po1, Po2. The output-side switching portion 32 switches the path to output the light signal fed from the switching portion 33, 34 to the desired output port Po1, Po2.

The first switching portion 33 makes a loop with the first delay optical fiber 10. The first switching portion 33 outputs the light signal, which is output from one output path of the input-side switching portion 31, to the output-side switching portion 32 to pass through the first delay optical fiber 10 or not to pass through the first delay optical fiber 10.

To explain the first switching portion 33 in more detail, one input-side path is connected to one output-side path of the input-side switching portion 31 and one output-side path is connected to one input-side path of the output-side switching portion 32. Also, the other output-side path and the other input-side path are connected to the first delay optical fiber 10 respectively. That is, the first switching portion 33 is constructed such that the light signal being output from the other output-side path goes back to the first switching portion 33 once again.

The second switching portion 34 is provided in parallel with the first switching portion 33. The second switching portion 34 makes a loop with the second delay optical fiber 20. The second switching portion 34 outputs the light signal, which is output from the other output path of the input-side switching portion 31, to the output-side switching portion 32 to pass through the second delay optical fiber 20 or not to pass through the second delay optical fiber 20.

To explain the second switching portion 34 in more detail, one input-side path is connected to the other output-side path of the input-side switching portion 31 and one output-side path is connected to the other input-side path of the output-side switching portion 32. Also, the other output-side path and the other input-side path are connected to the second delay optical fiber 20 respectively. That is, the second switching portion 34 is constructed such that the light signal being output from the other output-side path goes back to the second switching portion 34 once again.

Input-side optical fibers Fi1, Fi2 are connected to the input ports Pi1, Pi2 of the optical switch 30 respectively, and input the light signal fed from the external device into the variable light signal delay apparatus 100. Output-side optical fibers Fo1, Fo2 are connected to the output ports Po1, Po2 of the optical switch 30 respectively, and output the light signal to the external device.

An example of operation of such variable light signal delay apparatus will be explained with reference to FIG. 2 to FIG. 4 hereunder. By way of example, the case where the input light signal is output to the output port Po1 via (a) the path passing through the first delay optical fiber 10, (b) the path passing through the second delay optical fiber 20, or (c) the path passing through neither the first delay optical fiber 10 nor the second delay optical fiber 20 will be explained herein. In this case, the same reference symbols are affixed to the same portions as those in FIG. 1 and their explanation will be omitted herein. Also, reference symbols are affixed to the portions that demand an explanation respectively.

First, (a) the path passing through the first delay optical fiber 10 (see FIG. 2) will be explained hereunder.

A driver (not shown) for outputting electric control signals to turn ON/OFF the switching portions 31 to 34 is provided. The driver turns ON the input-side switching portion 31, turns OFF the first switching portion 33, and turns ON the output-side switching portion 32. Here, the second switching portion 34 may be turned ON or OFF arbitrarily. Accordingly, as indicated with a dot-dash line in FIG. 2, the light signal is transmitted via the input-side optical fiber Fi1 and input from the input port Pi1 to the optical switch 30, and then is passed through the path that is switched by the input-side switching portion 31 to propagate to the first switching portion 33. Then, the light signal is passed straight through the first switching portion 33 and is input into the first delay optical fiber 10. Then, the light signal is delayed by the first delay optical fiber 10 by a time that corresponds to a length of this fiber, and is passed straight through the first switching portion 33 once again. Then, the light signal is passed through the path that is switched by the output-side switching portion 32, then is output from the output port Po1, and then is output to the external device via the output-side optical fiber Fo1.

Next, (b) the path passing through the second delay optical fiber 20 (see FIG. 3) will be explained hereunder.

The driver (not shown) turns OFF the input-side switching portion 31, turns OFF the second switching portion 34, and turns OFF the output-side switching portion 32. Here, the first switching portion 33 may be turned ON or OFF arbitrarily. Accordingly, as indicated with a broken line in FIG. 3, the light signal is transmitted on the input-side optical fiber Fi1 and input from the input port Pi1 to the optical switch 30, and then is passed straight through the input-side switching portion 31 to propagate to the second switching portion 34. Then, the light signal is passed straight through the second switching portion 34 and is input into the second delay optical fiber 20. Then, the light signal is delayed by the second delay optical fiber 20 by a time that corresponds to a length of this fiber, and is passed straight through the second switching portion 34 once again. Then, the light signal is passed straight through the output-side switching portion 32, then is output from the output port Po1, and then is output to the external device via the output-side optical fiber Fo1.

Finally, (c) the path passing through neither the first delay optical fiber 10 nor the second delay optical fiber 20 (see FIG. 4) will be explained hereunder.

The driver (not shown) turns OFF the input-side switching portion 31, turns ON the second switching portion 34, and turns OFF the output-side switching portion 32. Here, the first switching portion 33 may be turned ON or OFF arbitrarily. Accordingly, as indicated with a dotted line in FIG. 4, the light signal is transmitted on the input-side optical fiber Fi1 and input from the input port Pi1 to the optical switch 30, and then is passed straight through the input-side switching portion 31 to propagate to the second switching portion 34. Then, the light signal is passed through the path that is switched by the second switching portion 34 to propagate to the output-side switching portion 32. Then, the light signal is passed straight through the output-side switching portion 32, then is output from the output port Po1, and then is output to the external device via the output-side optical fiber Fo1.

Figure 2:
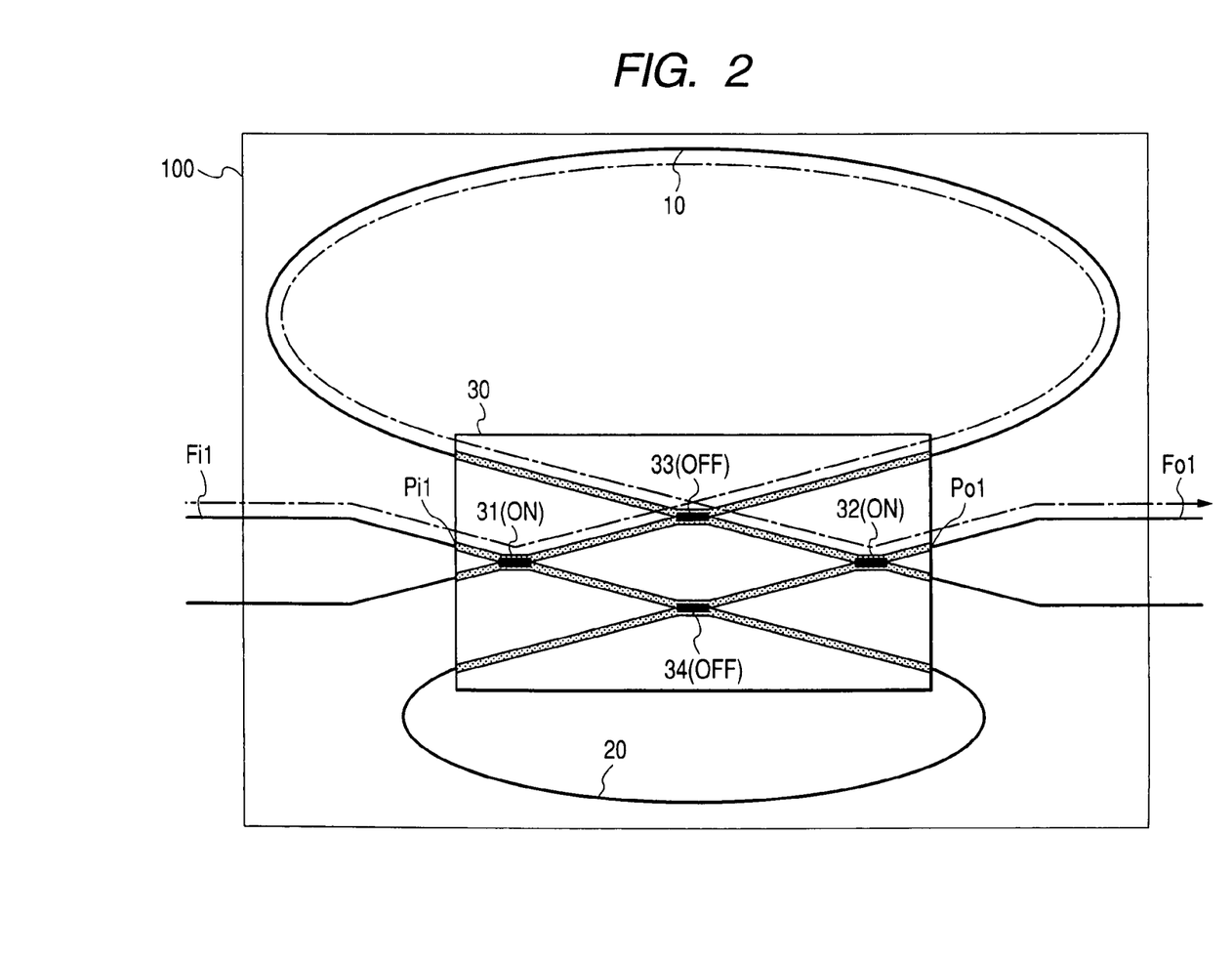
FIG. 2 is a view illustrating a path that goes along a first delay optical fiber.
Figure 3:
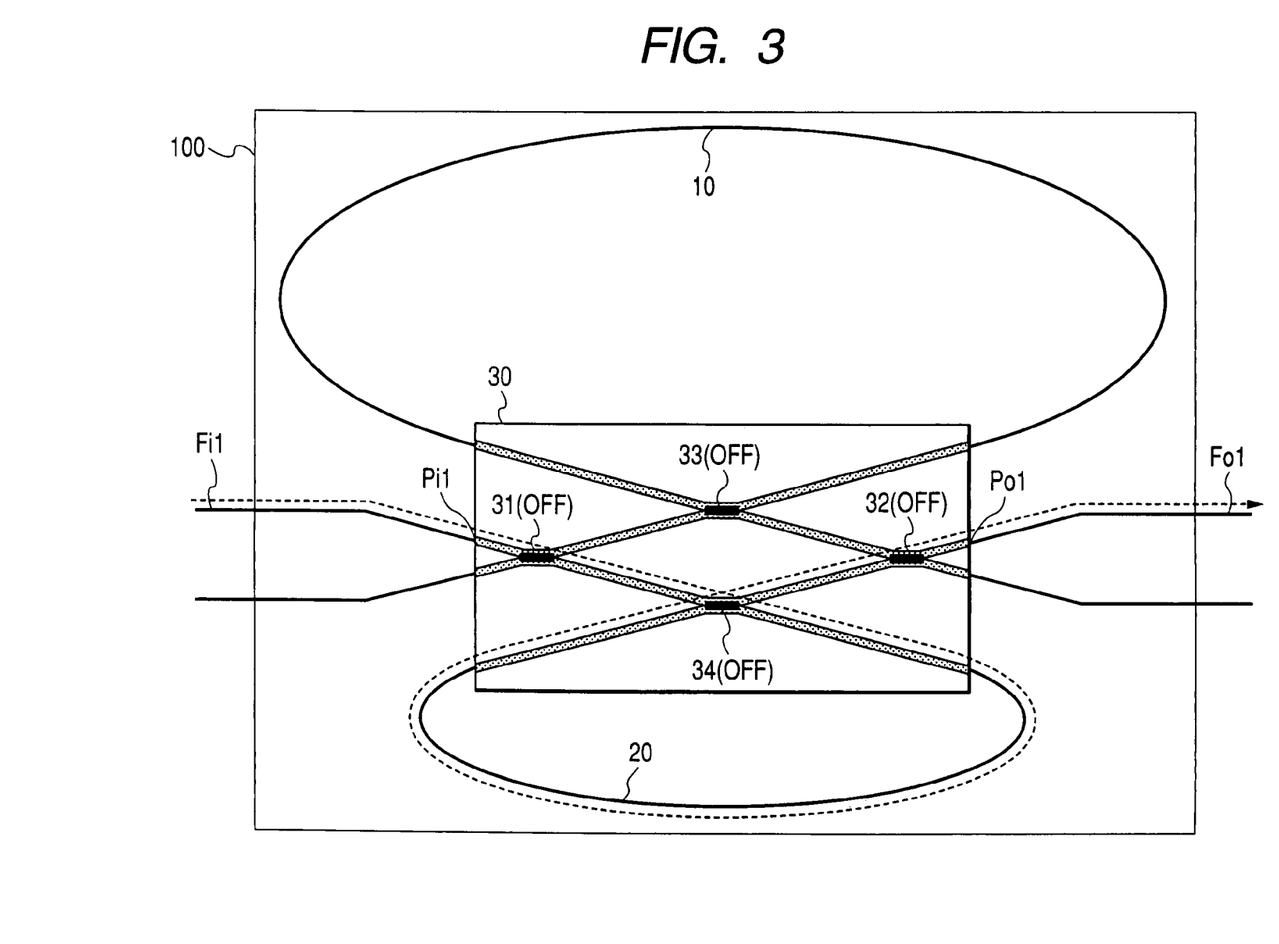
FIG. 3 is a view illustrating a path that goes along a second delay optical fiber.
Figure 4:
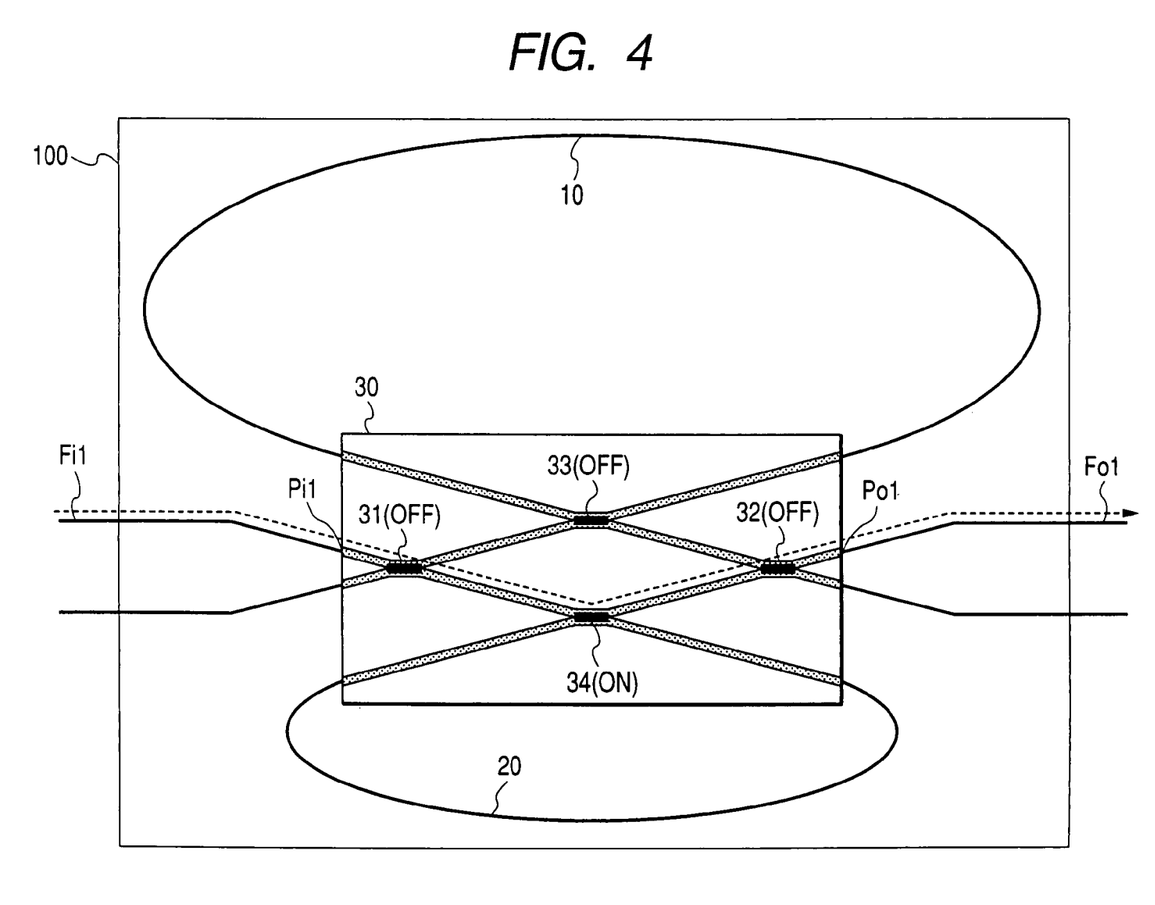
FIG. 4 is a view illustrating a path that goes along neither the first delay optical fiber nor the second delay optical fiber.

In contrast, in the case where the light signal is output via the output-side optical fiber Fo2, the output-side switching portion 32 should be set in its opposite state in FIG. 2 to FIG. 4 respectively (i.e., the switching portion 32 is turned OFF in FIG. 2, and the switching portion 32 is turned ON in FIG. 3 and FIG. 4 respectively). Also, in the case where the light signal being input from the input port Pi2 is output to the output port Po1, the input-side switching portion 31 should be set in its opposite state in FIG. 2 to FIG. 4 respectively. Therefore, their explanation will be omitted herein. Similarly, in the case where the light signal being input from the input port Pi2 is output to the output port Po2, the input-side switching portion 31 and the output-side switching portion 32 should be set in their opposite states in FIG. 2 to FIG. 4 respectively. Therefore, their explanation will also be omitted herein.

In this manner, the light signal being input into one (or both) of the input ports Pi1, Pi2 can be passed through the paths that are switched by the switching portions 31 to 34 respectively, and then output from the desired output port Po1, Po2. Also, according to switching combinations of the paths, the light signal can be output to either of the output-side optical fibers Fo1, Fo2 to pass through the delay optical fibers 10, 20 having a different length respectively or to pass through none of the delay optical fibers 10, 20. Therefore, a delay time of the light signal can be changed in three ways. As a result, the delay time of the light signal can be varied with a simple configuration. Also, a shift amount of optical bits of the light signal can be varied, a label of a header of the optical packet can be exchanged between different formats, and others. In addition, because the delay time of the light signal is set variably, the variable light signal delay apparatus of the present embodiment can be applied to the high-level optical signal processing such as the optical logic circuit, or the like. Further, because the variable light signal delay apparatus of the present embodiment is simple in configuration, such variable light signal delay apparatus can be manufactured easily and is worthy in practical use.

Next, a variable light signal delay system that includes the variable light signal delay apparatus shown in FIG. 1 as a basic structure and is capable of setting a wide variety of delay times will be explained hereinafter.

Figure 5:
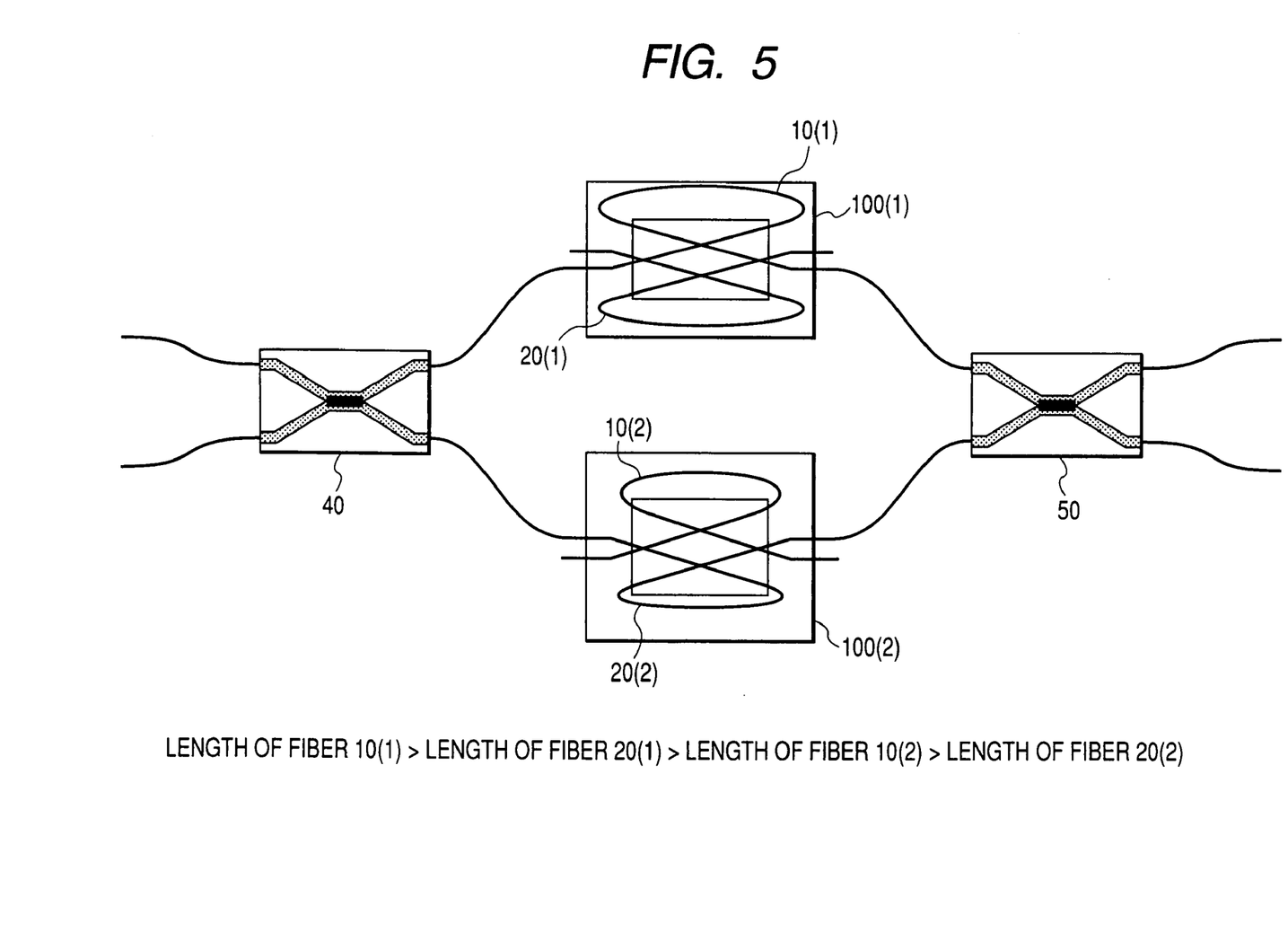
FIG. 5 is a configurative view showing a first embodiment of a variable light signal delay system according to the present invention.

FIG. 5 is a configurative view showing a first embodiment of a variable light signal delay system according to the present invention. In FIG. 5, the variable light signal delay apparatuses 100(1), 100(2) shown in FIG. 1 are provided in parallel with each other. Also, respective lengths of the delay optical fibers provided in the variable light signal delay apparatuses are set differently.

For example, a length of the first delay optical fiber 10(1) and a length of the second delay optical fiber 20(1) provided in the variable light signal delay apparatus 100(1) are set to L1(1) and L2(1) respectively. Then, a length of the first delay optical fiber 10(2) and a length of the second delay optical fiber 20(2) provided in the variable light signal delay apparatus 100(2) are set to L1(1) and L2(1) respectively. Then, a relationship "L1(1)>L2(1)>L1(2)>L2(2)" is assumed.

A second optical switch 40 has at least two inputs, and acts as an input port of the variable light signal delay system. Then, the second optical switch 40 switches the paths to output the light signal to the desired variable light signal delay apparatus 100(1) or 100(2).

A third optical switch 50 has at least two outputs, and acts as an output port of the variable light signal delay system. Then, the third optical switch 50 switches the paths to output the light signal fed from the desired variable light signal delay apparatus 100(1) or 100(2) from the desired output port.

An operation of such variable light signal delay system will be explained hereunder.

The light signal is input from at least one input port of the second optical switch 40. Then, the driver (not shown) outputs electric control signals to switch the paths of the optical switches 40, 50 and the variable light signal delay apparatuses 100(1), 100(2). Accordingly, the light signal being input into the second optical switch 40 is delayed by the variable light signal delay apparatus 100(1) or the variable light signal delay apparatus 100(2), and then is output from the desired output port of the third optical switch 50.

In this manner, the light signal being input into one (or both) of the input ports of the second optical switch 40 is passed through the paths that are switched by the second optical switch 40, the variable light signal delay apparatus 100(1) or 100(2), and the third optical switch 50, and is output from the desired output port of the third optical switch 50. Also, respective lengths of the delay optical fibers 10(1), 10(2), 20(1), 20(2) provided to the variable light signal delay apparatuses 100(1), 100(2) are set differently. That is, according to switching combinations of the paths, a delay time of the light signal can be changed in five ways. As a result, the delay time of the light signal can be varied with a simple configuration. Also, a shift amount of optical bits in the light signal can be varied, a label of a header of the optical packet can be exchanged between different formats, and the like. In addition, because the delay time of the light signal can be varied, the variable light signal delay system of the present invention can be applied to the high-level optical signal processing such as the optical logic circuit, or the like. Further, because the configurations of the variable light signal delay apparatuses 100(1), 100(2) serving as the basic structure are made simple, such variable light signal delay system can be manufactured easily and has the high practical value.

Here, five types of delay times correspond to the path passing through the first delay optical fiber 10(1), the path passing through the second delay optical fiber 20(1), the path passing through the first delay optical fiber 10(2), the path passing through the second delay optical fiber 20(2), and the path passing through none of the delay optical fibers 10(1), 10(2), 20(1), 20(2), which are given in order of larger delay time.

Next, another variable light signal delay system that contains the variable light signal delay apparatus as the basic structure like FIG. 5 and is capable of setting a wider variety of delay times than those in FIG. 5 will be explained hereinafter.

Figure 6:
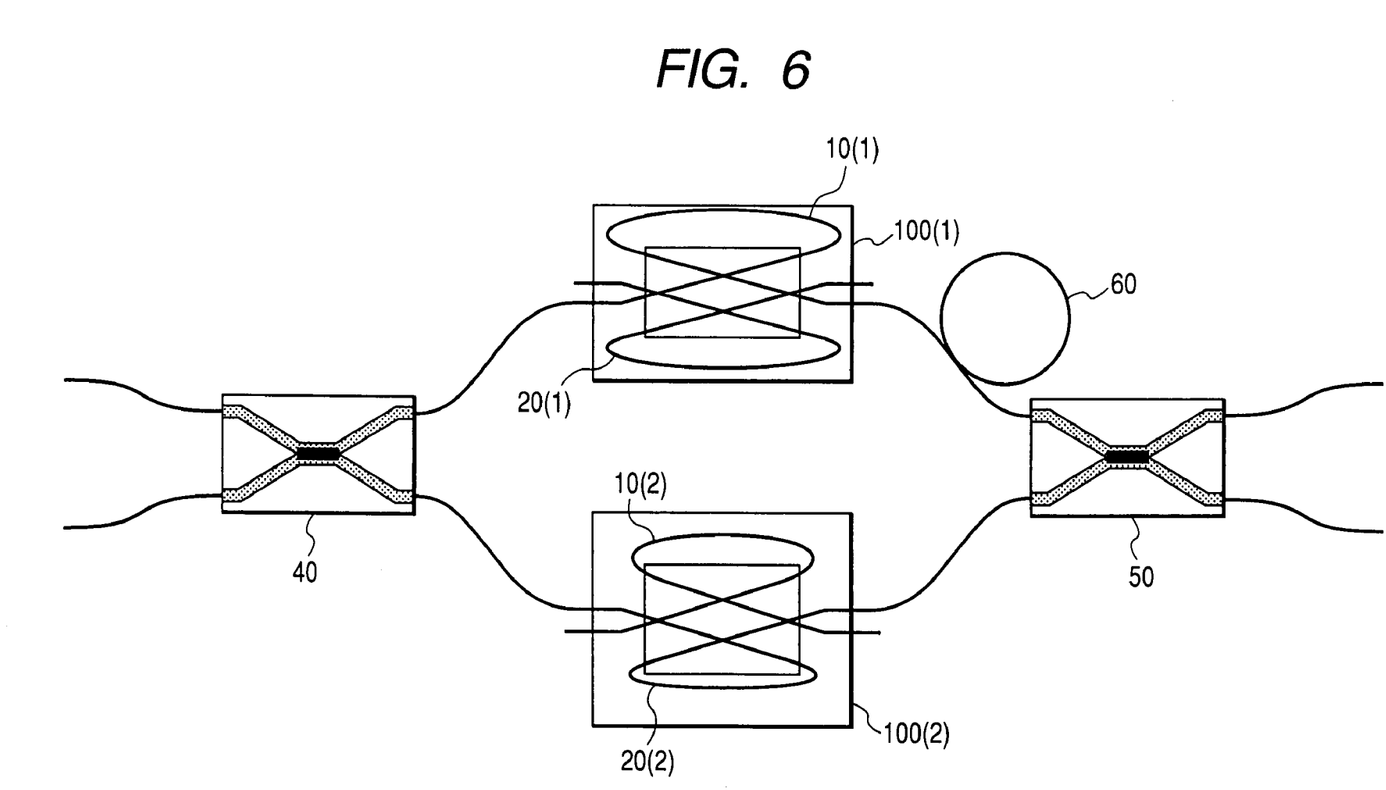
FIG. 6 is a configurative view showing a second embodiment of a variable light signal delay system according to the present invention.

FIG. 6 is a configurative view showing a second embodiment of the variable light signal delay system according to the present invention. In this case, the same reference symbols are affixed to the same portions as those in FIG. 5 and their explanation will be omitted herein. In both FIG. 5 and FIG. 6, the optical fibers are provided to the variable light signal delay apparatuses 100(1), 100(2) respectively to connect the variable light signal delay apparatuses 100(1), 100(2) to the third optical switch 50, and then the light signal is transmitted from the variable light signal delay apparatuses 100(1), 100(2) to the third optical switch 50 by these optical fibers respectively.

In FIG. 6, respective lengths of the optical fibers for connecting the variable light signal delay apparatuses 100(1), 100(2) to the optical switches are different. For example, a third delay optical fiber 60 is provided newly between the variable light signal delay apparatus 100(1) and the third optical switch 50.

An operation of such variable light signal delay system will be explained hereunder. The operation of the variable light signal delay system shown in FIG. 6 is almost similar to that of the variable light signal delay system shown in FIG. 5, but a difference in operation resides in that the light signal being output from the variable light signal delay apparatus 100(1) is delayed largely by the third delay optical fiber 60 and then is input into the third optical switch 50. For example, the delay times of respective paths are given as "the path passing through the variable light signal delay apparatus 100(1) but passing through none of the first delay optical fibers 10(1), 10(2)">"the path passing through the first delay optical fiber 10(2)".

In this way, the light signal is delayed by the third delay optical fiber 60 and then is input into the third optical switch 50. That is, according to switching combinations of the paths, the delay time of the light signal can be changed in six ways. As a result, a delay time of the light signal can be varied with a simple configuration. Also, a shift amount of optical bits in the light signal can be varied, a label of a header of the optical packet can be exchanged between different formats, and others. In addition, because the delay time of the light signal can be varied, the variable light signal delay system of the present invention can be applied to the high-level optical signal processing such as the optical logic circuit, or the like. Further, because the configurations of the variable light signal delay apparatuses 100(1), 100(2) acting as the basic structure are made simple, such delay system can be manufactured easily and is valuable in the practical use.

Now, the present invention is not limited to above embodiments, and a following example may be applied. In the delay systems shown in FIG. 5 and FIG. 6, such a structure is shown that two variable light signal delay apparatuses 100(1), 100(2) are provided in parallel with each other, but any number of variable light signal delay apparatuses may be provided. For example, when n variable light signal delay apparatuses are provided, the optical switch 40 of a 2-input/n-output type may be employed and the optical switch 50 of an n-input/2-output type may be employed. Of course, lengths of the delay optical fibers provided to the variable light signal delay apparatuses are changed respectively. In this manner, a variable range of the delay time of the light signal can be expanded easily by just increasing the number of the variable light signal delay apparatuses. As a result, the delay time of the light signal can be varied with a simple configuration.

In the delay systems shown in FIG. 6, such a structure is shown that the lengths of the delay optical fibers 10(1), 10(2), 20(1), 20(2) provided to the variable light signal delay apparatuses 100(1), 100(2) are set differently respectively. But the lengths of the first delay optical fibers 10(1), 10(2) are set identically, and also the lengths of the second delay optical fibers 20(1), 20(2) are set identically.

Besides, in the variable light signal delay apparatus shown in FIG. 1, such a structure is shown that the input-side optical fibers Fi1, Fi2 and the output-side optical fibers Fo1, Fo2 are provided. But these optical fibers may be omitted because they are not the indispensable portions.

What is claimed is:

1. A variable light signal delay apparatus, comprising:
    a first delay optical fiber;
    a second delay optical fiber having a length different from the first delay optical fiber; and
    a first optical switch having two first input ports, two first output ports, and paths, through which a light signal propagates, provided between the first delay optical fiber and the second delay optical fiber, in which a light signal input from at least one of the first input ports is propagated through either the first delay optical fiber or the second delay optical fiber or through neither the first delay optical fiber nor the second delay optical fiber to be output from a desired first output port;
    wherein the first optical switch comprises four switching portions monolithically formed on one substrate, and the four switching portions are coupled to each other through an optical waveguide.

2. The variable light signal delay apparatus according to claim 1, wherein the first optical switch switches an output-side path of a light signal to one of two ways, and
    the four switching portions are:
    an input-side switching portion to which light signal is input from at least one of the first input ports,
    an output-side switching portion which switches the output-side path to output a light signal from a desired output port,
    a first switching portion which forms a loop with the first delay optical fiber, in which a light signal output from one output path of the input-side switching portion is propagated through the first delay optical fiber or not through the first delay optical fiber to output to the output-side switching portion, and
    a second switching portion which forms a loop with the second delay optical fiber, in which a light signal output from another output path of the input-side switching portion is propagated through the second delay optical fiber or not through the second delay optical fiber to output to the output-side switching portion.

3. A variable light signal delay system, comprising:
    a plurality of the variable light signal delay apparatus according to claim 1, which are provided in parallel;
    a second optical switch having two second input ports, in which a light signal input from at least one of the second input ports is output to a desired variable light signal delay apparatus through a path to be switched by the second optical switch; and
    a third optical switch having two second output ports, in which a light signal input from the desired variable light signal delay apparatus is output from a desired second output port through a path to be switched by the third optical switch;

wherein first delay optical fiber and the second delay optical fiber provided in the plurality of variable light signal delay apparatuses have different lengths.

4. The variable light signal delay system according to claim 3, further comprising:

a plurality of optical fibers which connect each of the variable light signal delay apparatuses and the third optical switch, and have a different length respectively.

5. A variable light signal delay system, comprising:

a plurality of the variable light signal delay apparatus according to claim 1, which are provided in parallel;

a second optical switch having two second input ports, in which a light signal input from at least one of the second input ports is output to a desired variable light signal delay apparatus through a path to be switched by the second optical switch;

a third optical switch having two second output ports, in which a light signal input from the desired variable light signal delay apparatus is output from a desired second output port through a path to be switched by the third optical switch; and a plurality of optical fibers which connect each of the variable light signal delay apparatuses and the third optical switch, and have a different length respectively.

6. The variable light signal delay system according to claim 3, wherein the first optical delay fiber in each of the plurality of light signal delay apparatuses is of an identical length.

7. The variable light signal delay system according to claim 6, wherein the second optical delay fiber in each of the plurality of the variable light signal delay apparatus is of an identical length.

8. The variable light signal delay system according to claim 5, wherein the first optical delay fiber in each of the plurality of the variable light signal delay apparatus is of an identical length.

9. The variable light signal delay system according to claim 8, wherein the second optical delay fiber in each of the plurality of the variable light signal delay apparatus is of an identical length.

10. The variable light signal delay system according to claim 3, wherein a third optical delay optical fiber is disposed between one of the plurality of the variable light signal delay apparatus and the third optical switch.

11. The variable light signal delay system according to claim 5, wherein a third optical delay optical fiber is disposed between one of the plurality of the variable light signal delay apparatus and the third optical switch.

12. The variable light signal delay apparatus according to claim 1, wherein the paths comprise:

a path which propagates the light signal through the first delay optical fiber;

a path which propagates the light signal through the second delay optical fiber; and a path which propagates the light signal straight through the first optical switch no delay.

13. The variable light signal delay apparatus according to claim 2, wherein each of the switching portions allow the light signal to continue through the switching portion if the switching portion is turned off, and do not allow the light signal to pass if the switching portion is turned on.

14. The variable light signal delay apparatus according to claim 13, wherein the light signal passes straight through the first optical switch when the first switching portion is turned on.

15. The variable light signal delay apparatus according to claim 13, wherein the light signal passes straight through the second switching portion when the second switching portion is turned on.

16. The variable light signal delay apparatus according to claim 3, wherein each of the first delay optical fiber and the second delay optical fiber provided in each of the plurality of variable light signal delay apparatuses has a different length.

* * * * *